Feb. 22, 1944. L. M. RANSBOTTOM 2,342,369
BAGGING MECHANISM
Filed May 13, 1941 2 Sheets-Sheet 1
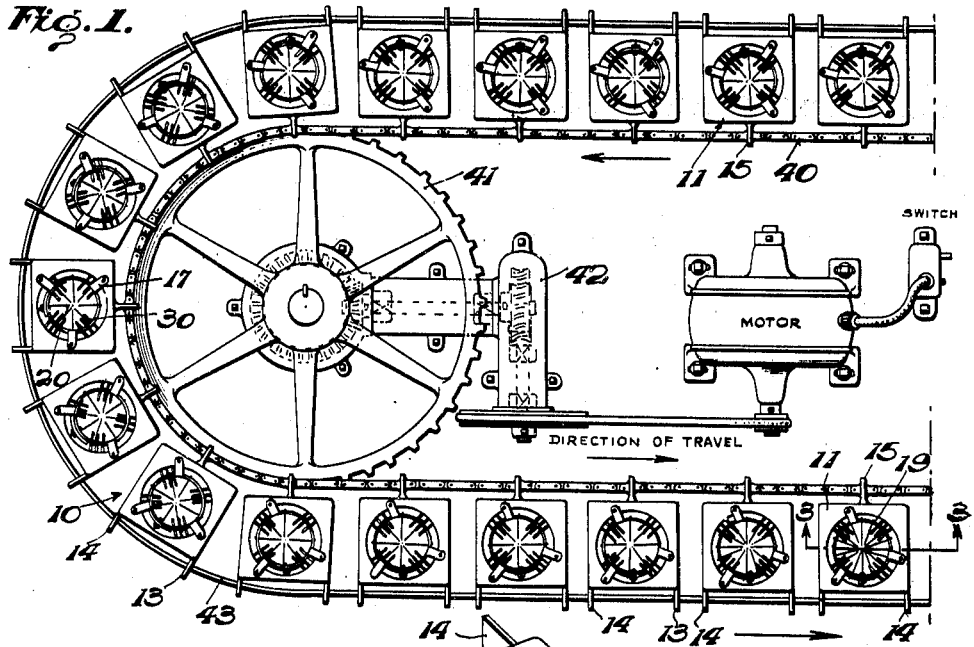
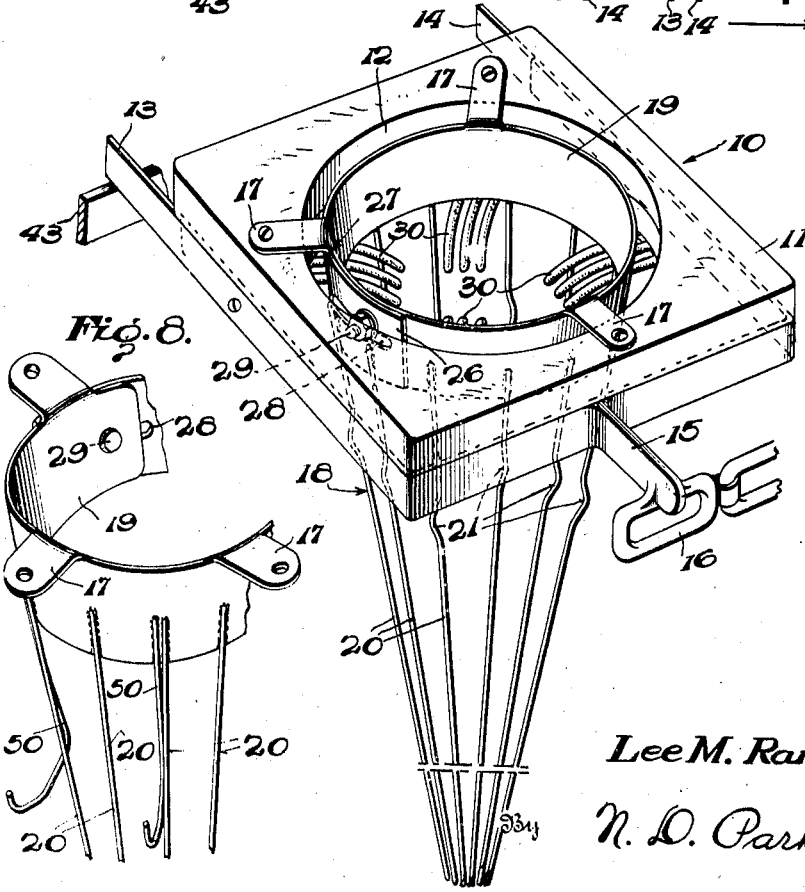
Inventor
Lee M. Ransbottom.
N. D. Parker Jr.
Attorney Feb. 22, 1944.   L. M. RANSBOTTOM   2,342,369
BAGGING MECHANISM
Filed May 13, 1941   2 Sheets-Sheet 2
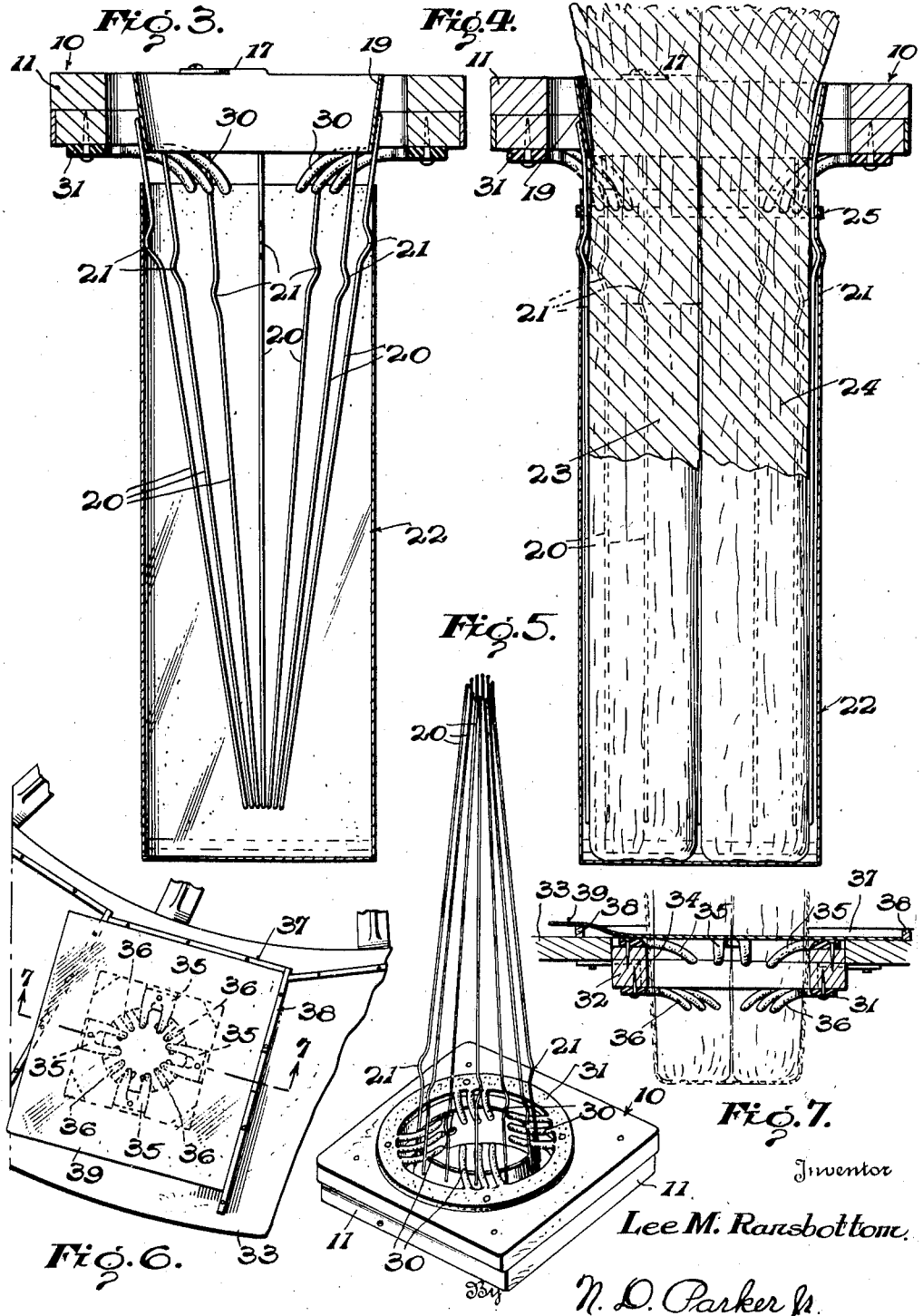
Inventor
Lee M. Ransbottom
By N. D. Parker Jr.
Attorney Patented Feb. 22, 1944

2,342,369

UNITED STATES PATENT OFFICE 2,342,369

BAGGING MECHANISM

Lee M. Ransbottom, Sanford, Fla.

Application May 13, 1941, Serial No. 393,271

3 Claims. (Cl. 226—18)

This invention relates to bagging mechanism and more particularly to a device for facilitating the wrapping, sacking or bagging of fresh vegetables, fruits, etc., in order to more effectively preserve the freshness thereof as well as to enhance the appearance of the articles.

Heretofore, it has been the practice in many instances to ship a large portion of perishable vegetables and fruits grown in various localities to distant markets in bulk packages, without wrapping or sacking each individual unit. While precooling and refrigeration methods are resorted to prior to and during shipment of the bulk packages in order that the vegetables and fruits reach the consumer in a fresh condition, nevertheless the units in such packages are subjected to the circulation of air which results in a rapid deterioration of quality as to freshness and flavor. Especially is this true with regard to vegetables such as celery, for example, which may rapidly dry out and lose much of its crispness and flavor before reaching the consumer.

It is accordingly one of the objects of the present invention to provide a novel machine for bagging individual units of vegetables, such as celery, for example, whereby the freshness thereof will be preserved from the time it leaves the packer to the time it reaches the consumer.

Another object is to provide a construction for quickly and efficiently bagging celery and other vegetables and fruits with a bag of transparent material in order to protect such commodities from contamination during transit and handling while enhancing the appearance of the product and enabling ready inspection of the contents of the bag.

A further object comprehends the provision of an arrangement for bagging celery and other articles wherein a bag is automatically maintained in position to receive the article, thus avoiding the necessity of an operator having to hold the bag in place as the article is bagged.

Still another object contemplates a construction of the foregoing character which is especially adaptable for bagging celery in a highly efficient manner.

Another object resides in the provision of a novel arrangement permitting a continuous operation of sacking or bagging celery or other units, the construction being such that the celery is sacked or bagged in a rapid manner while eliminating all possibility of mutilating or scarring the stalks during such operation.

Other objects and novel features of the invention will appear more fully hereinafter from the following detailed description of the invention when taken in connection with the accompanying drawings, illustrating some of the forms which the invention may take. It is to be expressly understood, however, that the drawings are for purposes of illustration only and are not to be taken as a definition of the limits of the invention, reference being had for this purpose to the appended claims.

In the drawings, wherein similar reference characters refer to similar parts throughout the several views:

Fig. 1 is a plan view of the novel bagging apparatus constituting the present invention and illustrating the continuous operation of a conveyor having a plurality of bagging units attached thereto;

Fig. 2 is perspective view of one form of bagging unit;

Fig. 3 is a side view in section of the unit of Fig. 2 illustrating the manner in which a bag is automatically held in position to receive a celery stalk or other unit to be bagged;

Fig. 4 is a view similar to Fig. 3 and illustrating that portion of the operation wherein the celery has been inserted in the unit and received by the bag;

Fig. 5 is a bottom perspective view of the unit of Fig. 2;

Fig. 6 is a partial plan view of a circular type of conveyor construction having a modified form of wrapping unit associated therewith;

Fig. 7 is an axial sectional view of the unit of Fig. 6 taken along lines 7—7 of the latter figure, and Fig. 8 is a partial perspective view of another form of bagging unit.

The present invention in its broader aspect comprehends the provision of a plurality of units for bagging or sacking celery or other commodities, such units being attached to a circular or rectangular conveyor structure for more efficient and rapid handling of the articles. In various stages of travel of the conveyor, one operator slips a bag into position upon the units as they are slowly moved past, under the action of any suitable arrangement for driving the conveyor. By the novel construction provided by the present invention, these bags are automatically maintained in position on the units. At another station, an operator projects the celery stalks or other articles into the units, which are so constructed as to maintain the articles in position. Thereafter, the continuous movement of the conveyor moves the units having the articles therein to another station where an operators slips a rubber band over the upper portion of the bag, and, at this station or a subsequent station, the lower portion of the bag may be grasped and the sacked celery may be drawn through the units for transfer to a suitable station for subsequent packing, precooling and shipment.

In a more specific aspect, the invention comprises a novel celery bagging unit comprising a funnel-shaped hopper member including an open mouth and a plurality of depending spring fingers which converge at their lower ends. These spring fingers are so constructed as to be capable of spreading apart when a celery stalk is projected through the open mouth of the funnel-shaped hopper but the resiliency of the fingers is such as to maintain the celery stalk in position after the thrusting force is relieved. These fingers are, moreover, so constructed and arranged as to provide means for frictionally maintaining a sack or bag of any suitable material in place thereon prior to projection of the celery stalk into the hopper, thus eliminating the necessity of an operator having to hold the bag in position as the celery stalk is moved into position.

With the above in mind, reference will now be had to Figs. 2 to 5 inclusive disclosing one form of the novel bagging unit referred to above. Therein, a unit 10 is disclosed as having a base 11 provided with a circular opening 12. Preferably, the base 11 is so constructed as to be removably positioned upon arms 13 and 14 of a yoke member 15, the latter being secured in any suitable manner, such as welding, for example, to a link 16 of a traveling chain conveyor.

Removably secured to the base 11, as by a plurality of ears 17, is a funnel-shaped hopper member 18, the latter comprising an upper collar 19 having a plurality of spring fingers or members 20 suitably secured thereto and depending therefrom. The fingers 20 may be comprised of spring wire, spring strips or other suitable material, the construction of which is such that, as a celery stalk or other article is projected through the collar 19 into contact with the spring members 20, the latter will yieldably grip the article but will be spread apart by the pressure thereof as it is projected further into the hopper.

As heretofore set forth, one of the important features of the present invention resides in the construction of the hopper member in such a manner as to automatically hold a bag in position to receive a celery stalk or other article to be bagged as it is thrust or projected into the hopper. Referring more particularly to Fig. 3, the aforementioned advantageous and desirable result is effected by providing a plurality of the spring members 20 with crimped portions 21 forming projections or humps adjacent the upper ends of the members. These projections or humps are so arranged that, when a bag 22, having its mouth open, is thrust upwardly and over the spring members 20, the mouth of the bag will slip over the projections 21 and the latter will frictionally maintain the bag in the position shown in Fig. 3 without further attention on the part of the operator. While, in Fig. 3, all of the depending spring members 20 have been illustrated as being provided with the crimped portions or projections 21, it will be understood that not all of the members need be provided with such projections, it being necessary to provide only a few such projections spaced circumferentially around the hopper so as to provide spaced points of frictional engagement with the bag 22 in order to maintain the same in proper position. It will also be understood that, as the bag is being assembled on the hopper unit, the hand of the operator, in forcing the bag upwardly, has a tendency to spring the members 20 inwardly so that the mouth of the bag readily slips over the projections 21. Thereupon, as the operator releases his grasp upon the bag and fingers, the latter will spring outwardly into their normal position illustrated in order to provide the frictional support for the bag referred to above. While, as above indicated, it may not be necessary to provide all of the fingers with the crimped portions 21, it will likewise be understood that, in the event that only three or four of the spring arms 20 are provided with projections, these spring arms need not extend the complete length of the hopper assembly but may terminate immediately below the projections if desired.

In order to speed up the operation of assembling the bags upon the hoppers, it may be desirable to provide a longer range where the bags may be efficiently gripped by the spring fingers. Such result may be readily secured by varying the positions of the projections 21 along the lengths of the spring fingers 20 as illustrated in Fig. 3, in which event, some bags, during the assembly operation, may be supported by the uppermost projections while others may be supported by the intermediate or lowermost projections.

After assembly of the bags on the hopper unit, as heretofore described, the celery stalk or other article to be bagged is thrust through collar 19 and downwardly to engage the spring fingers 20 and spread them apart as illustrated in Fig. 4. In this figure, there is illustrated this step in the operation of the construction and the same shows a pair of celery stalks 23 and 24 projected downwardly as above described. It will be readily understood that, during this operation, the outward movement of the spring fingers 20 serves to increase the frictional engagement between the upper portion of the bag and the projections 21 so that the bag is firmly held in place as the celery stalks are projected downwardly to spread the fingers apart and to engage the bottom of the bag. Thereafter, a rubber band 25 is snapped over the upper portion of the bag and the lower portion of the latter may be grasped by the operator and the bagged celery or other article withdrawn downwardly through the hopper. When this operation is completed, the spring fingers 20 return to the position illustrated in Fig. 3 and are ready to receive another bag 22.

One of the features of the present invention resides in a construction whereby the size of the hopper 18 may be readily varied in order to accommodate bags of different sizes. As shown, Fig. 2, the collar 19 is adjustable in order to secure this desirable result. Preferably, the ends 26 and 27 of the collar 19 overlap, one end being provided with an opening, not shown, and the other with a slot 28, a screw and nut construction 29 being employed for maintaining the ends 26 and 27 of the collar in various positions of adjustment. It will be understood that, when the collar 19 is enlarged or rendered smaller, the ears 17 are removed from the base 11 and, after adjustment is made, these ears are secured to the base in a new location and in any suitable manner.

In handling celery, it will be readily understood that care should be exercised in avoiding mutilation and scarring of the stalks. Moreover, since the limbs of the stalks are inclined to spread outwardly adjacent the tops, a difficult problem is presented when the stalks are projected through a hopper such as has been heretofore described since the upper portions of the limbs may have a tendency to scrape and be bruised as the stalk is passed through the collar 19. In order to eliminate any possibility of the above and to closely confine the limbs of the stalk and press the same inwardly, a novel construction, including a plurality of groups 30 of yieldable fingers, is positioned immediately below the collar 19. As shown, such fingers are arranged in four groups but it will be readily understood that a series of equally spaced fingers may be provided if desired. Preferably, the fingers are in the form of yieldable rubber projections, suitably secured to a ring 31 attached to the underside of the base 11, see Fig. 5, and these fingers project inwardly and downwardly as shown in Figs. 2 to 5. In operation, as the celery stalk is moved downwardly through the hopper, the fingers 30 engage the limbs of the stalk and press the same inwardly in order to confine the limbs and facilitate the sacking or bagging operation. The resiliency of the fingers 30, moreover, cooperates with the resiliency of the spring members 20 for the purpose of holding the article in the position illustrated in Fig. 4 in the event that the filled hopper unit is to be passed to another station for assembly of the rubber band 25 and subsequent withdrawal of the bagged article from the hopper. The bags 22 may be made of any suitable material but preferably are constituted by material of a transparent nature, such as "Pliofilm" or "Cellophane."

A slightly different form of the invention is illustrated in Figs. 6 and 7, and, in this construction, the celery stalk or other article is wrapped with a sheet of transparent or other wrapping material as it is passed through the hopper. More particularly, and referring to Figs. 6 and 7, the hopper in this form of the invention includes a base 32 secured in any suitable manner to a circular or other type of conveyor 33 and provided with an opening 34. As shown in Fig. 6, four groups of yieldable, resilient fingers 35 are secured to the base 32 and project into the opening 34 while a second series of groups of fingers 36 are secured to the underside of the base 32 and likewise project into the opening 34. The two series of fingers 35 and 36 are thus arranged one above the other, and, as shown in Fig. 6, illustrating a plan view of the construction, the groups of fingers 36 are arranged immediately below the spaces between the groups of fingers 35. A pair of right-angularly related guide strips 37 and 38 are secured to the conveyor construction in such a manner that, when a sheet of wrapping material 39 is placed so that adjacent sides abut the guide strips 37 and 38, the center of the wrapper will coincide substantially with the center of the opening 34. In this position, a stalk of celery may be thrust downwardly through the opening 34, and, during such downward movement, the sides of the wrapper 39 will be forced upwardly to engage the lower portion of the celery stalk through cooperation of the series of yieldable fingers 35 with the wrapper 39. As the stalk is moved further, the wrapper will contact the series of yieldable fingers 36 and the latter will cooperate with the diagonal or corner portions of the wrapper to efficiently fold the same inwardly. The resiliency of the fingers 35 and 36 is such that, after the celery stalk has been moved downwardly to a position where the wrapper is about to lose contact with the lower series of yieldable fingers, the stalk will be maintained in this position whereupon an operator may snap a rubber band over the wrapper and thereafter remove the wrapped stalk for packing and shipment.

Referring more particularly to Fig. 1, a plurality of hopper units 18 are shown therein as secured to spaced links 16 of a conveyor chain 40. The latter is driven by a suitable sprocket wheel 41 through a drive mechanism 42 of any convenient construction. The conveyor includes a stationary guide rail 43 upon which arms 13 and 14 of each particular hopper unit 18 slide during operation of the conveyor structure, and, as heretofore noted, the bags may be assembled on the hopper units at one station and the sacking of the celery and removal thereof may take place at other stations.

A further form of bagging unit is shown in Fig. 8 and, in this embodiment, the spring fingers 20 cooperate with spring arms 50 to frictionally maintain the bag in position on the hopper. As illustrated, the spring arms 50 are positioned closely adjacent the fingers 20 and the lower ends are normally biased inwardly with respect to the fingers. With this construction, the bag, when forced upwardly, is frictionally gripped between the fingers 20 and arms 50, the latter engaging the outer surface of the bag and urging the inner surface thereof into firm frictional contact with the fingers 20. Any suitable number of spring arms 50 may be employed, and it will also be understood that the fingers 20 may be provided with the projections 21 of Fig. 2 if desired, in order to increase the frictional support for the bag.

There has thus been provided by the present invention a novel and efficiently operable bagging device and mechanism for sacking or bagging celery and other units. While the particular construction disclosed herein has been described with some particularity in connection with the bagging of celery, it will be understood that the proportion of the parts may be varied to adapt the invention for bagging or sacking other vegetables, fruits or articles. The construction provided, moreover, is readily adaptable to the bagging of individual units, or clusters of such units, as desired. The utilization of a hopper having a plurality of depending and converging spring fingers, which are so constructed as to provide means for automatically holding a bag in position to receive the article to be bagged, avoids the necessity of an operator manually holding the bag in position and thus the operation of bagging is materially facilitated. While it is advantageous in many instances to utilize the yieldable fingers in connection with the hopper member, for confining the limbs of the celery stalks as they are being bagged, it will be understood that, if desired, these yieldable members may take forms other than those illustrated or may be eliminated if desired. The novel conveyor construction described above materially facilitates the rapid and efficient bagging of the articles and is so arranged that, during its travel, any particular bagging unit upon which an operator has not completed a step of the bagging operation is returned to the operator. Such an arrangement localizes the bagging operations and thus results in a material saving of space in the packing plant.

While several forms of the invention have been illustrated and described herein with considerable particularity, it will be understood that the invention is not limited thereto but may be embodied in other forms without departing from the spirit of the invention, as will be readily understood by those skilled in the art. Reference will therefore be had to the appended claims for a definition of the limits of the invention.

What is claimed is:

1. A bagging device for celery stalks comprising a hopper having a cylindrical upper portion and a plurality of downwardly extending spring fingers converging at their lower ends, means on said fingers to frictionally hold a bag in position to receive a celery stalk projected through said hopper, and yieldable means positioned in the hopper adjacent the cylindrical upper portion for yieldably urging the limbs of the celery stalk together as the stalk is passed through the hopper.

2. A machine for bagging celery comprising an annular frame, a plurality of members supported by said frame and extending downwardly, said members being biased to bring the lower ends thereof into converging relationship, and movable apart as a celery stalk is projected downwardly through said frame to discharge the stalk into a bag, and yieldable means positioned adjacent the frame for urging the limbs of the stalk together as the latter is projected downwardly to be bagged.

3. A wrapping device for celery stalks comprising a member provided with an opening, means for maintaining a wrapper in position with respect to said member and opening for receiving a celery stalk as it is projected downwardly through said opening, and a plurality of yieldable fingers carried by said member projecting laterally into the opening for yieldably urging the limbs of the celery stalk together as the stalk is projected through the opening.

LEE M. RANSBOTTOM.